United States Patent
Dobbins

[11] 3,897,137
[45] July 29, 1975

[54] DISPLAY DEVICE CONTAINING A LIQUID-CRYSTAL CELL AND A SUSPENDED-CRYSTAL CELL ARRANGED IN SERIES

[75] Inventor: John P. Dobbins, San Marino, Calif.

[73] Assignee: Rockwell International Corporation, El Segundo, Calif.

[22] Filed: Jan. 28, 1974

[21] Appl. No.: 437,594

[52] U.S. Cl............................ 350/160 LC; 350/267
[51] Int. Cl.².............................................. G02F 1/13
[58] Field of Search........... 350/160 R, 160 LC, 267

[56] References Cited
UNITED STATES PATENTS

| | | |
|---|---|---|
| 3,257,903 | 6/1966 | Marks.................................. 350/267 |
| 3,675,988 | 7/1972 | Soref............................ 350/160 LC |

*Primary Examiner*—Edward S. Bauer
*Assistant Examiner*—Matthew W. Koren
*Attorney, Agent, or Firm*—H. Fredrick Hamann; G. Donald Weber, Jr.

[57] ABSTRACT

A display device using liquid-crystal material and suspended-crystal material to produce a display device exhibiting high visibility and excellent contrast. The display includes a multilayered configuration of conductive elements (electrodes) appropriately supported on suitable support means with separate layers of liquid-crystal material or suspended-crystal material between the layers.

13 Claims, 4 Drawing Figures

DISPLAY DEVICE CONTAINING A LIQUID-CRYSTAL CELL AND A SUSPENDED-CRYSTAL CELL ARRANGED IN SERIES

BACKGROUND

1. Field of the Invention

This invention relates to display devices.

2. Background and Prior Art

Many types of display devices are known in the art. Many of these display devices are of the so-called "light-reflecting" readout devices. These types of devices, which are generally electro-optically operable, utilize either liquid-crystal materials, suspended-crystal materials or the like. Liquid-crystal display devices are well known in the art and have been discussed in articles and patents for several years. The term "suspended-crystal material" denotes a fluid electro-optic medium comprising colloidally dispersed electrically dipolar crystalloids, such as herapathite suspended in a transparent, essentially dielectric liquid, as described in U.S. Pat. No. 3,257,903 discussed infra.

One problem which has plagued this type of display and inhibited the known devices is the fact that contrast is dependent upon the viewing angle, on the nature of the reflecting background, on light distribution in the surroundings, and on the properties of the liquid-crystal materials used.

Moreover, it is known in the art to essentially "stack" several electrically responsive light-controlling devices (e.g. shutters, filters, and the like) to establish different phenomena or achieve certain results. This kind of apparatus and approach is suggested in U.S. Pat. No. 3,257,903 to A. M. Marks which primarily relates to suspended-crystal liquids (herapathite crystals). In this patent, each of the cells contains a differently colored suspension of otherwise similar material in order to establish different color images. U.S. Pat. No. 3,669,525 to J. E. Adams et al, suggests the stacking of liquid-crystal display devices for filtering different colors, i.e. light wavelengths, from a light source. U.S. Pat. No. 3,679,290 to Adams et al is quite similar and also teaches the stacking of liquid-crystal displays to obtain an optical filter system. U.S. Pat. No. 3,675,988 to R. A. Soref shows a liquid-crystal stack arrangement for use as an electro-optical measurement and display device.

The aforementioned patents are representative of the best prior art known to applicant. Of course, other prior-art patents are known which relate to liquid-crystal display devices in general and which describe and define the transmissive mode of operation or the reflective mode of operation for liquid-crystal display devices. However, the cited prior art relates to "stacked" devices. A detailed and exhaustive analysis of well known liquid-crystal prior-art devices is not made, in an attempt to avoid complexity of this description.

Nevertheless, in the known prior-art devices, a major problem relative to liquid-crystal devices is found in the visibility thereof. For example, in the devices which have a reflective rear surface, ambient light, viewer light and the like is reflected in a distracting or confusing manner to the viewer. This effect renders the readout of the display difficult or impossible.

Some attempts have been made to use a black background instead of a mirrored or silvered background. For the most part, these attempts have been unsuccessful, because the forward scattered light is not reflected back to the viewer but is absorbed by the black background. The backward scattered light from the display device is of such low intensity that contrast is insufficient for legibility. Consequently, different approaches are required.

SUMMARY OF THE INVENTION

A multilayered configuration of components combined to produce an improved display device is described. The first cell including liquid-crystal material is stacked on a further cell including suspended-crystal material. The back plate of the liquid-crystal cell and the front plate of the suspended-crystal cell are common. The back panel of the display device (the back panel of the suspended-crystal cell) includes a mirrored or silvered surface for reflecting light to the viewer. Electrodes are placed on the inner surfaces of both of the plates which contain the liquid-crystal material therebetween in a typical liquid-crystal cell. Electrodes are also applied to the inner surfaces of both plates which contain the suspended-crystal material therein. By selectively controlling the application of electrical signals to the electrodes and generating fields across the liquid-crystal material and the suspended-crystal material, a character is generated by the display device. That is, the liquid-crystal material, when activated, exhibits turbidity which causes light scattering. Application of the field across the suspended-crystal material causes this material to become transparent. Consequently, forward scattering light from the liquid-crystal material is permitted to impinge upon and be reflected by the silvered surface of the back plate and to be returned through the front plate of the display to the viewer. The unactivated suspended-crystal material remains substantially opaque and absorbs any ambient light which is transmitted through the otherwise transparent (i.e. unactivated) liquid-crystal material. Consequently, a high-contrast display cell is produced.

BRIEF DESCRIPTION OF A PREFERRED EMBODIMENT OF THE INVENTION

Figure 1:
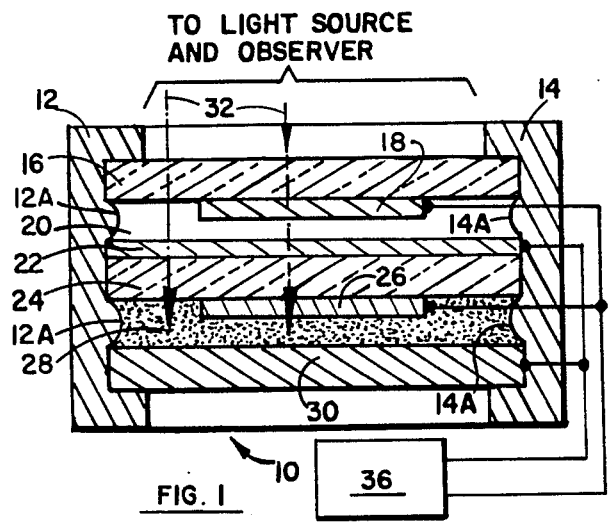
FIG. 1 is a cross-sectional view of a schematic representation of the display device of the instant invention.

Throughout the description and the drawings, common elements bear common reference numerals.

Referring now to FIG. 1 there is shown a cross-sectional view of a schematic representation of a display device in accordance with the instant invention. This representation is schematic only and other specific details may be provided by those skilled in the art, in accordance with known techniques. Moreover, the representation shown in the various figures is not necessarily to scale.

Referring to FIG. 1, a display cell 10 includes a first plate 16 of transparent material such as glass. Affixed to one surface of plate 16 is electrode 18. Electrode 18 may be affixed to plate 16 in any suitable fashion known in the art. Electrode 18 is typically a transparent, electrically conductive material such as tin oxide or the like.

A second plate 24 is spaced away from and generally parallel to plate 16. Plate 24 may also be fabricated of a transparent material such as glass. In fact, in a typical application, plates 16 and 24 are substantially identical in terms of material. This identity is extremely useful in order to provide compatible indices of refraction and other characteristics for light being transmitted through a cell as described hereinafter. Electrode 22 is affixed to one surface of plate 24 while electrode 26 is affixed to the opposite surface of plate 24 in any suitable manner. Again, electrodes 22 and 26 are typically fabricated of transparent, electrically conductive material such as tin oxide. Electrodes 18, 22 and 26 are, in a preferred embodiment, also fabricated of substantially identical material.

It should be noted that electrode 22 is shown as being disposed over the entire surface of plate 24 which faces the electrode-bearing surface of plate 16. This representation is schematic only and indicates that electrode 22 is, effectively, the back plate electrode in a liquid-crystal device as is known in the art. This electrode is, usually, not restricted in configuration other than to insure complete overlapping of electrodes 18 and 22. The specific dimensions of electrode 22 are otherwise unimportant. Electrodes 22 and 26, however, are intended to be substantially identical in configuration. That is, electrodes 22 and 26 will have substantially the same size and shape. These electrodes will be in generally close vertical alignment relative one to the other.

Plate 30 is spaced from and in generally parallel relationship to plate 24 (and plate 16). Plate 30, in the preferred embodiment, is an electrically conductive plate fabricated of a suitable material such as a metal. The inner surface, i.e. the surface facing plate 24, will be a highly polished or mirrored surface. Obviously, plate 30 could be a plastic or glass plate which has a metal or polished surface thereon facing the surface of plate 24.

Plates 16, 24 and 30 are held in the preferred alignment by a suitable mounting bracket which includes left side element 12 and right side element 14. Of course, side elements 12 and 14 may be connected together in a suitable manner to form an outer boundary or support means for the device. Side elements 12 and 14 are shown to include protrusions 12A and 14A, respectively. These protrusions form ledges for supporting plates 16, 24 and 30 in the spaced apart relationship as described supra. Of course, protrusions 12A and 14A may be replaced by suitable epoxy spacers or any other suitable material or elements. The specific mechanical arrangement for establishing the construction of this device is not critical to the invention, per se.

A relatively thin layer of liquid-crystal material 20 is interposed between plates 16 and 24. More importantly, at least a portion of the liquid-crystal material is disposed between electrodes 18 and 22 as well.

Similarly, a relatively thin layer of suspended-crystal material 28 is disposed between plates 24 and 30 and particularly between electrode 26 and the electrically conductive portion of plate 30.

The electrodes 18 and 26 are shown connected together and to one terminal of source 36. Electrode 22 and the electrically conductive portion of plate 30 are also connected together and to another terminal of source 36.

Figure 2:
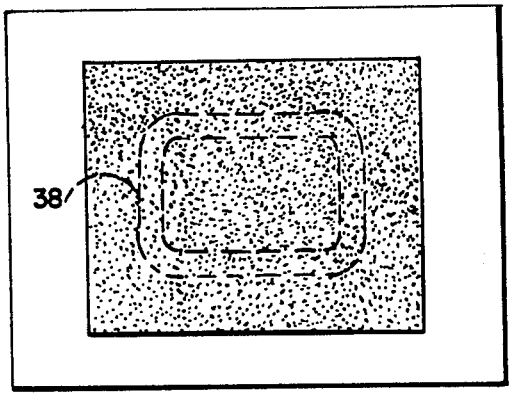
FIG. 2 is a top view of the display device shown in FIG. 1 when it is not activated.

In discussing the operation of the device shown in FIG. 1, concurrent reference is also made to FIG. 2. FIG. 2 is a top view of cell 10. In particular, FIG. 2 is a view of cell 10 of FIG. 1 from top surface of plate 16.

Typically, when unactivated, liquid-crystal material 20 is substantially transparent and clear. Consequently, any light applied thereto, such as represented by arrows 32 in FIG. 1, passes completely therethrough without any significant effect on the light-crystal material.

Conversely, in the typical or unactivated condition, suspended-crystal material 28 tends to be relatively opaque wherein any light applied thereto, such as light rays represented by arrows 32, is substantially completely absorbed.

Initially, it is assumed that source 36 is not energized and does not apply any signals to the respective electrodes of cell 10 in FIG. 1. Light, represented by arrows 32, and supplied by a light source (not shown) is transmitted through transparent plate 16, transparent electrode 18, transparent liquid-crystal material 20, transparent electrode 22, transparent plate 24, and transparent electrode 26. However, this light which has been transmitted through the various transparent elements now strikes or impinges upon unactivated suspended-crystal material 28. The light is substantially completely absorbed by suspended-crystal material 28. As a result, little or no light reaches the silvered or mirrored surface of plate 30. Consequently, no light is reflected from this mirrored surface back through the transparent elements of the cell to the observer.

As best indicated in FIG. 2, the observer therefore tends to observe only the opaque or dark background produced by suspended-crystal material 28. The character 38, shown in dashed outline, represents the configuration of the character defined by electrodes 18 and 26. The dashed outline is shown only for convenience. This dashed outline will not be visible to the observer.

Figure 3:
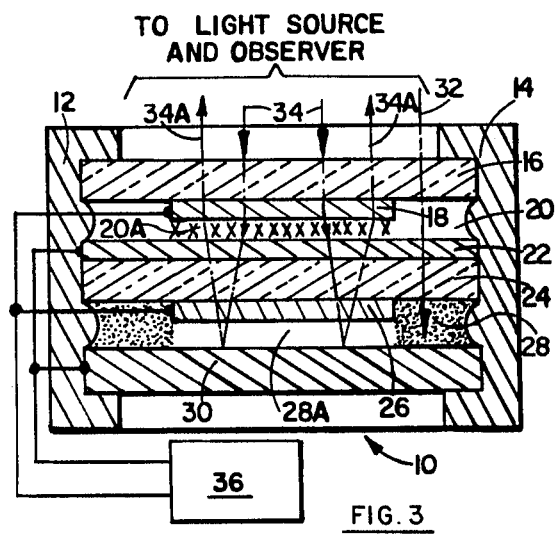
FIG. 3 is a cross-sectional view of the schematic representation of the display device of the instant invention when activated.

Referring now to FIG. 3, there is shown cell 10 which is substantially identical to cell 10 of FIG. 1. However, it is assumed that source 36 is now energized and supplying electrical signals to the respective electrodes. The application of the signals, such as voltages or electrical potentials, to the respective electrodes causes the generation of electric fields between the electrodes in a standard and well known manner. Thus, an electrical field is produced between electrodes 18 and 22 through liquid-crystal material 20. This field has the effect of creating turbidity in a portion 20A of liquid-crystal material 20. It is noted that the turbid portion 20A of liquid-crystal material 20 is confined to the region between electrodes 18 and 22 wherein the electrical field is generated. For convenience, fringe effects have been ignored inasmuch as they are generally of little consequence in any event.

Similarly, the application of signals from source 36 produces an electric field between electrodes 26 and plate 30. Again, an electrode field is effective to cause a reaction in suspended-crystal material 28 whereby portion 28A of suspended-crystal material becomes (highly) transparent. It is noted that this transparent portion 28A is again defined by the overlapping or overlying portions of the electrodes.

It should be noted that, inasmuch as electrodes 18 and 26 have been defined to be of substantially similar configuration, and in alignment, turbid portion 20A of liquid-crystal material 20 and transparent portion 28A of suspended-crystal material 28 are also in substantial alignment.

If now light, represented by arrows 34, is supplied by the source (not shown), light rays are freely transmitted through transparent plate 16 and transparent electrode 18. However, due to the turbidity of the liquid-crystal material 20 at portion 20A, scattering of the light occurs. This scattering is schematically represented by the slightly offset portion of the light ray which represents forward scattering and which proceeds through to the remainder of the cell. Indications of back scattering of light from 20A toward the observer (which is of relatively small magnitude) have been omitted for clarity. The forward-scattered light again is transmitted through transparent electrode 22, transparent plate 24, and transparent electrode 26. In this condition, however, the light now is freely transmitted through the (highly) transparent portion 28A of suspended-crystal material 28. The forward-scattered light, thus, impinges upon the silvered or mirrored surface of plate 30 and is reflected back through the cell. This reflection is indicated by the return lines which pass through the cell and emerge as arrow 34A. This light is then returned to the observer. Thus, it is seen that the back-scattered light (not shown) is presented to the observer. Concurrently, the forward-scattered light (which represents the major portion of the light) is reflected from the mirrored surface of plate 30 to the observer as well. Consequently, the observer now is able to view both the back- and forward-scattered light.

Concurrently, light such as represented by arrow 32 in FIG. 3 which does not pass through the activated regions 20A and 28A of the liquid and suspended-crystal materials, functions as the light represented by arrow 32 in FIG. 1. That is, the light represented by arrow 32 in FIG. 3 is transmitted through the entire cell until it is effectively fully absorbed by suspended-crystal material 28. Consequently, no light is returned from the unactivated regions of the cell.

Figure 4:
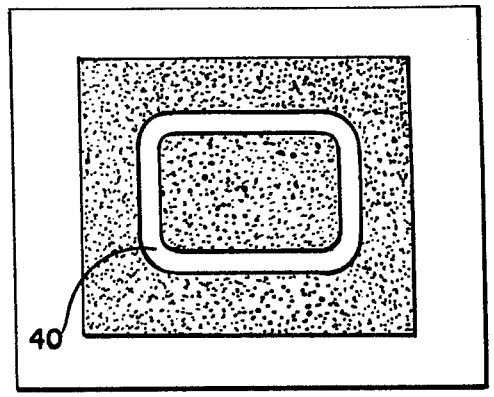
FIG. 4 is a top view of the display device when activated as suggested in FIG. 3.

Referring to FIG. 4, it is seen that light falling without the boundaries of electrodes 18 and 26 is absorbed by suspended-crystal material 28 and presents the same dark background as was observed in the display of FIG. 2. However, light, such as represented by arrows 34, which passes through the affected areas of the liquid-crystal material and the suspended-crystal material (i.e. the material between the activated electrodes) is returned to the viewer and presents a character 40 thereto.

Obviously, while a character in the nature of an oval or the like is shown, other alphanumeric characters can be generated by the appropriate arrangement of individual electrode segments at the location of electrodes 18 and 26. Obviously, if additional electrodes or electrode segments are utilized, the driving arrangement from source 36 would be modified appropriately.

Thus, there has been shown and described a preferred embodiment of a display device using liquid-crystal material and suspended-crystal material. This display device exhibits extremely high contrast to an observer which improves the visual readout of the display. This improved visual readout is advantageous to a human observer as well as to a machine reader or the like.

This display produces an increased contrast ratio for the character to be displayed versus the background. A relatively simple device configuration is established. Moveover, it is readily seen that the two activated materials, i.e. liquid-crystal and suspended-crystal, operate in opposite manners to the similar stimuli. Consequently, a relatively inexpensive and relatively simple display cell is possible. Another significant advantage of the instant device, as contrasted with a simple, suspended-crystal cell, is that the light-reflecting characters exhibit a diffuse white (rather than a specular white) appearance against a dark or black background.

There has been shown and described a preferred embodiment of the invention. Those skilled in the art will undoubtedly conceive of modifications and improvements on this cell. However, so long as the improvements or modifications fall within the purview of this description, they are intended to be included therein. This description is intended to be illustrative and is no way limitative of the invention. The scope of the invention is determined only by the appended claims.

What is claimed is:

1. In combination,
a liquid-crystal cell, which becomes transformed from a transparent state to a turbid state upon being energized
a suspended-crystal cell which becomes transformed from an absorptive state to a transparent state upon being energized disposed adjacent to and overlying said liquid-crystal cell, and
means for selectively energizing each of said cells concurrently to produce a display effect by the combined operation of the respective cells in response to the energizing thereof.

2. The combination recited in claim 1 wherein said liquid-crystal cell includes a pair of substantially parallel plates with liquid-crystal material therebetween,
said suspended-crystal cell includes a pair of substantially parallel plates with suspended-crystal material therebetween,
at least one of the plates of each of said pair of plates being a common plate.

3. The combination recited in claim 2 including electrodes on each of said plates, whereby electrical fields can be established through the liquid-crystal material and the suspended-crystal material.

4. The combination recited in claim 3 wherein at least one electrode in each cell has the same configuration, and
the electrodes having the same configuration are aligned with each other.

5. In combination,
first, second, and third plates in spaced-apart, substantially parallel relation,
a layer of liquid-crystal material between said first and second plates,
a layer of suspended-crystal material between said second and third plates, and
electrically conducting electrodes formed on both surfaces of said second plate and on the surface of said first and third plates which face said second plate,
the electrode on said first plate and the electrode on the surface of said second plate which faces said third plate having the same configuration and being in alignment.

6. The combination recited in claim 5 wherein said third plate includes an inner surface which is reflective.

7. The combination recited in claim 6 including
means for selectively applying a potential to said electrodes to concurrently produce an electric field through the respective crystal materials such that said liquid-crystal material is rendered substantially turbid and at substantially the same time said suspended-crystal material is rendered effectively transparent.

8. The combination recited in claim 5 wherein said first and second plates are transparent, and
said electrodes are transparent.

9. The combination recited in claim 6 wherein said third plate comprises an electrically conductive material.

10. The combination recited in claim 5 wherein said liquid crystal material is of the dynamic scattering type.

11. The combination recited in claim 5 wherein said suspended crystal material is a fluid electro optic medium comprising colloidally dispersed electrically dipolar crystals.

12. The combination recited in claim 4 wherein the other electrode in each cell completely encompasses said one electrode in the associated cell.

13. The combination recited in claim 5 wherein said electrodes include individual electrode segments arranged in a suitable array to selectively define a plurality of characters.

* * * * *

UNITED STATES PATENT AND TRADEMARK OFFICE
CERTIFICATE OF CORRECTION

PATENT NO. : 3,897,137

DATED : July 29, 1975

INVENTOR(S) : John P. Dobbins

It is certified that error appears in the above–identified patent and that said Letters Patent are hereby corrected as shown below:

Column 4, line 11, after "light" and before the hyphen, insert --or the liquid--;

Column 4, line 60, change "electrode" to --electric--.

Signed and Sealed this sixteenth Day of December 1975

[SEAL]

Attest:

RUTH C. MASON
Attesting Officer

C. MARSHALL DANN
Commissioner of Patents and Trademarks